Figure 1:
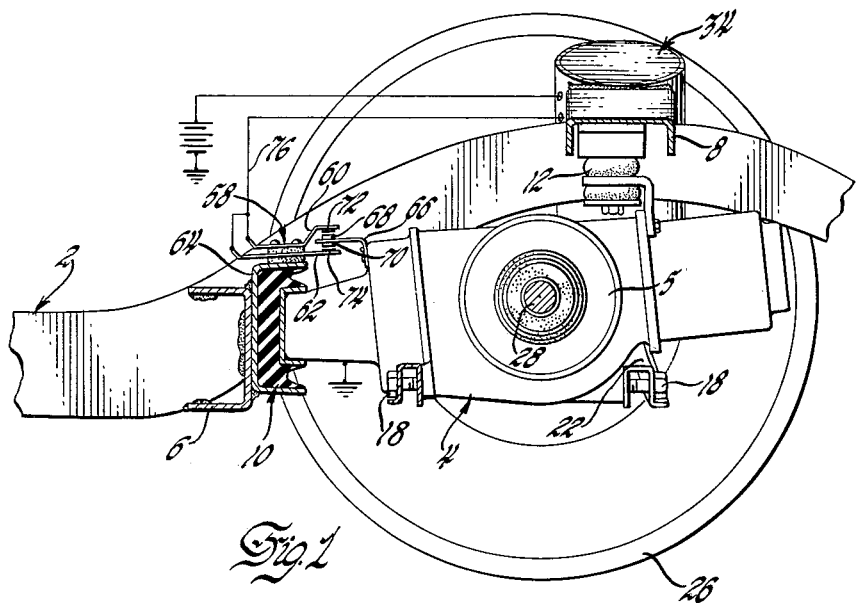

April 25, 1961

A. E. ROLLER 2,981,354

PNEUMATIC VEHICLE SUSPENSION WITH
TORQUE RESPONSIVE PITCH CONTROL

Filed April 15, 1959

INVENTOR.
Albert E. Roller
BY
W. F. Wagner
ATTORNEY

United States Patent Office 2,981,354
Patented Apr. 25, 1961

2,981,354

PNEUMATIC VEHICLE SUSPENSION WITH TORQUE RESPONSIVE PITCH CONTROL

Albert E. Roller, Birmingham, Mich., assignor to General Motors Corporation, Detroit, Mich., a corporation of Delaware Filed Apr. 15, 1959, Ser. No. 806,485
9 Claims. (Cl. 180—73)

This invention relates to vehicle suspension and more particularly to pneumatic vehicle suspension incorporating automatic pitch control mechanism.

Due to the relatively low rate of pneumatic springs, vehicles equipped with such springs are more inclined to exhibit pitching, diving, and squatting characteristics than is the case with conventional suspension utilizing high rate springs. Various proposals have been advanced in the past for overcoming or diminishing this tendency, such as temporarily blocking movement of air to or from the springs while the vehicle is in a non-level attitude as a result of acceleration, braking, etc. While such systems prevent aggravation of undesirable vehicle inclination, no positive pitch control is attained thereby. In other cases, it has been proposed to provide air springs which are connected to auxiliary air chambers via conduits in which are located valves adapted to open and close responsive to pendulum or other acceleration responsive switching means. However, in practice, these devices fail to achieve the desired result owing to the fact that the connecting conduits impose a high damping or restricting effect upon the interchange of air between the spring and associated auxiliary chamber with the result that additional air volume is inactive regardless of whether the valve is open or closed. In addition, experience has shown that pendulum operated switches, mercury switches, and other such acceleration sensitive devices commonly utilized in proposed systems leave a great deal to be desired in terms of reliability, economy of manufacture, and ability to anticipate change in vehicle attitude.

An object of the present invention is to provide an improved pneumatic suspension system.

A further object is to provide an air suspension system incorporating automatic means for resisting diving, squatting, and pitching of the sprung mass.

Still a further object is to provide an arrangement of the stated character wherein operation of the automatic means is a direct function of torque reaction in the vehicle differential driving mechanism, and is thereby capable of slightly anticipating the ultimate change in vehicle attitude.

Yet a further object is to provide a vehicle suspension system including a plurality of air springs wherein the total volume of air acted upon by each spring is enclosed in a partitioned chamber, the partition having a normally open aperture therein of sufficient diameter to substantially eliminate damping effect so that interchange of air between the partitioned chambers is substantially unrestricted, the arrangement further including remotely controlled valve mechanism capable of closing the aperture so that under certain vehicle conditions support of the sprung mass is accomplished by elastic deformation of only the air in one of the partitioned chambers.

Another object is to provide an arrangement of the stated character wherein control of the valve means is effected by switching mechanism mounted in part on the vehicle frame and in part on a differential drive mechanism housing elastically supported on the frame, the switch being constructed and arranged so that either acceleration or deceleration torque reaction of the differential housing will cause the valve means in each spring to move to the closed position.

Figure 2:
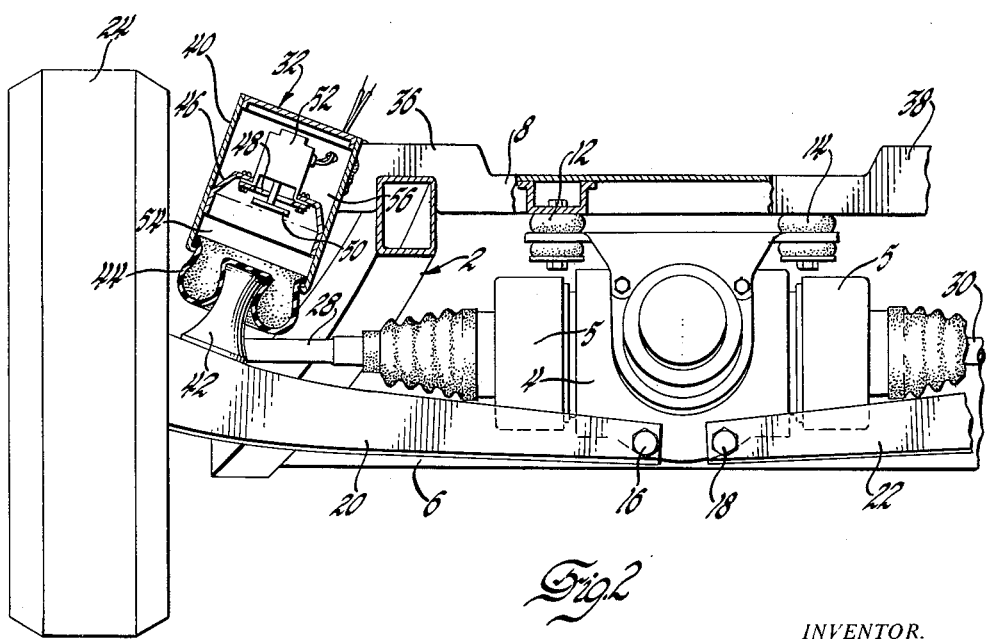

These and other objects, advantages, and features of the invention will become more fully apparent as reference is had to the accompanying specification and drawings wherein:

Fig. 1 is a fragmentary side elevational view, partly in section, of a rear suspension arrangement according to the invention; and Fig. 2 is a fragmentary end elevational view, partly in section, of the arrangement shown in Fig. 1, illustrating particularly the form and construction of the pneumatic spring structure.

Referring now to the drawings, reference numeral 2 designates generally the vehicle frame or sprung mass. Disposed below frame 2 is a housing 4 which encloses the vehicle differential drive mechanism and supports inboard brakes 5. Housing 4 is resiliently connected to longitudinally spaced frame cross members 6 and 8 by means of a single forward elastic mount 10 disposed between member 6 and the forward end of housing 4, and a pair of laterally spaced rearward elastic mounts 12 and 14 disposed between member 8 and the rearward end of housing 4. As seen best in Fig. 2, differential housing 4 has pivotally secured thereto at 16 and 18 a pair of transversely extending wheel control arms 20 and 22. At their outer extremities, arms 20 and 22 rotatably support vehicle driving wheels 24 and 26, respectively, which are operatively connected to the differential mechanism by means of live axles 28 and 30. In order to resiliently support the vehicle frame 2 with respect to wheels 24 and 26, there are provided air springs 32 and 34 which extend between arms 20 and 22 and outrigger portions 36 and 38 of rear frame cross member 8.

In accordance with one feature of the invention, springs 32 and 34 are constructed and arranged so that the major portion of elastic fluid is confined in a compartmented chamber. Inasmuch as each of the springs is identical in construction, the following description is made with reference to spring 32 only, it being understood to apply equally to spring 34 and the vehicle front springs, not shown. As seen best in Fig. 2, spring 32 comprises a compartmented cylindrical chamber 40 which is rigidly attached to cross member outrigger 36. Connected to control arm 20 in substantial axial alignment with cylinder 40 is a spring piston 42 which is adapted for reciprocable movement in and out of cylinder 40. Extending between the lower open end of cylinder 40 and piston 42 is a flexible bellows 44. Interiorly thereof, cylinder 40 is provided with a vertically intermediate wall or partition 46 having a relatively large diameter aperture 48 in which is disposed a normally open valve element 50. Valve 50 is adapted to be moved to a position closing aperture 48 by a solenoid motor 52 so that deflection of wheel 24 will cause piston 42 to act either on the entire volume of air contained in the lower chamber 54 and upper chamber 56 or upon the air confined in lower chamber 54 only, depending upon the position of valve element 48.

In accordance with another feature of the invention, energization of solenoid motor 52 is effected by means of a switch assembly 58. As seen best in Fig. 1, switch assembly 58 comprises a pair of terminals 60 and 62 mounted in vertically spaced fixed relation on the frame mounted bracket portion 64 of flexible mount 10, and a single contact arm 66 rigidly mounted on differential housing 4. Contact arm 66 is initially positioned so that under conditions of normal vehicle operation, the opposed contact elements 68 and 70 thereon are equally spaced from terminal elements 72 and 74 of terminals 60 and 62. Accordingly, during normal vehicle operation, the solenoid motor 52 is deenergized and hence remains in the open position shown in Fig. 2 thereby allowing piston 42 to act on the entire volume of air in chambers 54 and 56 and provide low rate elastic support for the sprung mass. However, upon the occurrence of either acceleration or deceleration, torque reaction of differential housing 4 incident to such deceleration or acceleration causes contact arm 66 to move angularly up or down, as the case may be, thus completing the electrical circuit 76 to solenoid motor 52 which closes valve 50 thereby reducing the volume of air acted upon by piston 42. It will, of course, be apparent that very substantially increased spring rate occasioned by reduction of air volume will strongly resist the tendency of the sprung mass to pitch in response to acceleration or deceleration. Naturally, as soon as the accelerating or decelerating condition ceases, differential housing 4 will resume its normal angular orientation and return switch arm 66 to the immediate position, thus deenergizing solenoid operated valve 50 and restoring spring 32 to normal low rate operation.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In combination with a vehicle having dual chambered air springs disposed between the sprung and unsprung mass, valve means between said chambers movable from an open position to a closed position preventing communication between said chambers, a differential structure yieldably supported on said sprung mass, and means actuated responsive to torque reaction of said differential for moving said valve means to said closed position.

2. In combination with a vehicle having dual chambered air springs disposed between the sprung and unsprung mass, electrically operated valve means between said chambers movable from an open position to a position preventing communication between said chambers, a differential structure yieldably supported on said sprung mass, and means for energizing said electrically operated valve means including switch means actuated responsive to torque reaction of said differential.

3. The structure set forth in claim 2 wherein said switch means comprises a pair of fixed spaced terminals having a common connection with said electrically operated valve and a movable contact element normally positioned between said terminals.

4. The structure set forth in claim 2 wherein said switch means comprises a pair of spaced terminals mounted on the sprung mass and a contact mounted on the differential between said spaced terminals.

5. In combination with a vehicle having dual chambered air springs disposed between the sprung and unsprung mass, valve means between said chambers movable from an open position to a position preventing communication between said chambers, a differential structure resiliently supported on said sprung mass, and control means for said valve means associated with said differential mechanism in a manner whereby the control means is directly actuated by torque reaction of the differential mechanism responsive to vehicle acceleration.

6. In combination with a vehicle having partitioned air springs disposed between the sprung and unsprung mass, solenoid valve means mounted in said partition movable upon energization from an open position to a position preventing communication between said chambers, a differential structure resiliently supported on said sprung mass, and switch means for controlling said solenoid valves, said switch means being associated with said differential mechanism in a manner whereby the former is directly actuated by torque reaction movement of said differential mechanism.

7. In combination with a vehicle having dual chambered air springs disposed between the sprung and unsprung mass, valve means between said chambers movable from an open position to a position preventing communication between said chambers, a differential structure yieldably supported on said sprung mass, and control means for said valve means associated with said differential mechanism in a manner whereby the former is directly actuated by acceleration and braking torque reaction of the differential mechanism.

8. In combination with a vehicle having power transmitting means yieldably supported on the sprung mass thereof, wheel supporting drive axles operatively connected to said power transmitting means, air springs disposed between said axles and said sprung mass, each of said springs including a rigid container having an apertured partition therein, motor driven valve means mounted on said partition operable to close said aperture and reduce the effective volume of said springs, and means actuated directly by torque reaction of said power transmitting means for controlling operation of said motor means.

9. In combination with a vehicle having power transmitting means resiliently supported on the sprung mass thereof, wheel supporting drive axles operatively connected to said power transmitting means, air springs disposed between said axles and said sprung mass, each of said springs including a rigid container having an apertured partition therein, electrically energized motor means operable to close said aperture and reduce the effective volume of said springs, and switch means actuated directly by torque reaction of said power transmitting means for controlling operation of said motor means.

References Cited in the file of this patent

UNITED STATES PATENTS

| | | |
|---|---|---|
| 1,975,642 | Landeweer | Oct. 2, 1934 |
| 2,827,282 | Weiss | Mar. 18, 1958 |
| 2,869,892 | Sahagian | Jan. 20, 1959 |